United States Patent
Langer et al.

(10) Patent No.: US 11,102,729 B2
(45) Date of Patent: Aug. 24, 2021

(54) MULTI-TRANSMISSION CAPABLE DATA TRANSMISSION SYSTEM AND METHOD OF OPERATING THE SAME

(71) Applicant: Apple Inc., Cupertino, CA (US)

(72) Inventors: Andreas Langer, Lohhof (DE); Thomas Bruder, Grafing (DE)

(73) Assignee: Apple Inc., Cupertino, CA (US)

( * ) Notice: Subject to any disclaimer, the term of this patent is extended or adjusted under 35 U.S.C. 154(b) by 874 days.

(21) Appl. No.: 15/736,416

(22) PCT Filed: May 23, 2016

(86) PCT No.: PCT/EP2016/061561
§ 371 (c)(1),
(2) Date: Mar. 27, 2018

(87) PCT Pub. No.: WO2016/206891
PCT Pub. Date: Dec. 29, 2016

(65) Prior Publication Data
US 2020/0037263 A1    Jan. 30, 2020

(30) Foreign Application Priority Data
Jun. 24, 2015  (DE) ............... 10 2015 110 160.2

(51) Int. Cl.
*H04W 52/24* (2009.01)
*H04W 52/08* (2009.01)
(Continued)

(52) U.S. Cl.
CPC ......... *H04W 52/243* (2013.01); *H04W 52/08* (2013.01); *H04W 52/10* (2013.01); *H04W 52/42* (2013.01); *H04W 52/52* (2013.01)

(58) Field of Classification Search
CPC ............................ H04W 52/243; H04B 7/02
See application file for complete search history.

(56) References Cited

U.S. PATENT DOCUMENTS 6,697,634 B1 * 2/2004 Hayashi ............... H04W 52/06
455/522
2006/0046763 A1    3/2006 Schwent et al.
(Continued)

FOREIGN PATENT DOCUMENTS

| CN | 101116262 A | 1/2008 |
|---|---|---|
| CN | 101646228 A | 2/2010 |

(Continued)

OTHER PUBLICATIONS

European Patent Office, PCT International Search Report and Written Opinion issued for PCT/EP2016/061561, 11 pgs., dated Jul. 25, 2016.

*Primary Examiner* — James P Duffy
(74) *Attorney, Agent, or Firm* — Eschweiler & Potashnik, LLC

(57) ABSTRACT

A data transmission system may comprise a first transmission chain comprising a first transmission power controller, the first transmission power controller being configured to operate in an open loop power control mode or in a closed loop power control mode; a second transmission chain; and a power control mode selector configured to select the first transmission power controller to operate in the open loop power control mode or in the closed loop power control mode based on at least one quantity indicative of interference induced by the second transmission chain in the first transmission power controller when operating in the closed loop power control mode.

23 Claims, 4 Drawing Sheets

(51) Int. Cl.
  *H04W 52/10*  (2009.01)
  *H04W 52/42*  (2009.01)
  *H04W 52/52*  (2009.01)

(56) References Cited

U.S. PATENT DOCUMENTS

2010/0015967 A1* 1/2010 Perets ............... H04W 4/00
                                                   455/422.1
2012/0257519 A1* 10/2012 Frank ............... H04W 52/16
                                                   370/252

FOREIGN PATENT DOCUMENTS

| CN | 102415007 A | 4/2012 |
| CN | 102687567 A | 9/2012 |
| CN | 103004103 A | 3/2013 |
| CN | 103493552 A | 1/2014 |
| CN | 103813429 A | 5/2014 |
| WO | WO-2008/055247 A1 | 5/2008 |
| WO | WO-2008/112849 A2 | 9/2008 |
| WO | WO-2009/051412 A2 | 4/2009 |

* cited by examiner

MULTI-TRANSMISSION CAPABLE DATA TRANSMISSION SYSTEM AND METHOD OF OPERATING THE SAME

FIELD

The disclosure relates to a multi-transmission capable data transmission system. In particular, the disclosure relates to a transmission power control system for a multi-transmission capable data transmission system and a method of controlling a transmission power of the multi-transmission capable data transmission system.

BACKGROUND

Data transmission systems may be an integral part of any telecommunication device, be it a mobile device or a cable based device. Data may be transmitted using different transmission powers depending on the current channel conditions and transmission requirements. Tight control of the transmission power may be crucial in order to ensure an accurate data transmission and/or data reception by the intended receiver. Furthermore, manufacturers aim to produce new data transmission systems having improved functionalities like, for example, increased data transfer rates, by, for example, employing multiple transmission chains simultaneously. However, in such multi-transmission systems, it may be necessary to employ an improved transmission power control system in order to obtain satisfactory transmission power control.

For these and other reasons there is a need for the current invention.

BRIEF DESCRIPTION OF THE DRAWINGS

The accompanying drawings are included to provide a further understanding of the invention. The elements of the drawings are not necessarily to scale relative to each other. Like reference numerals designate corresponding similar parts.

DETAILED DESCRIPTION

Figure 1:
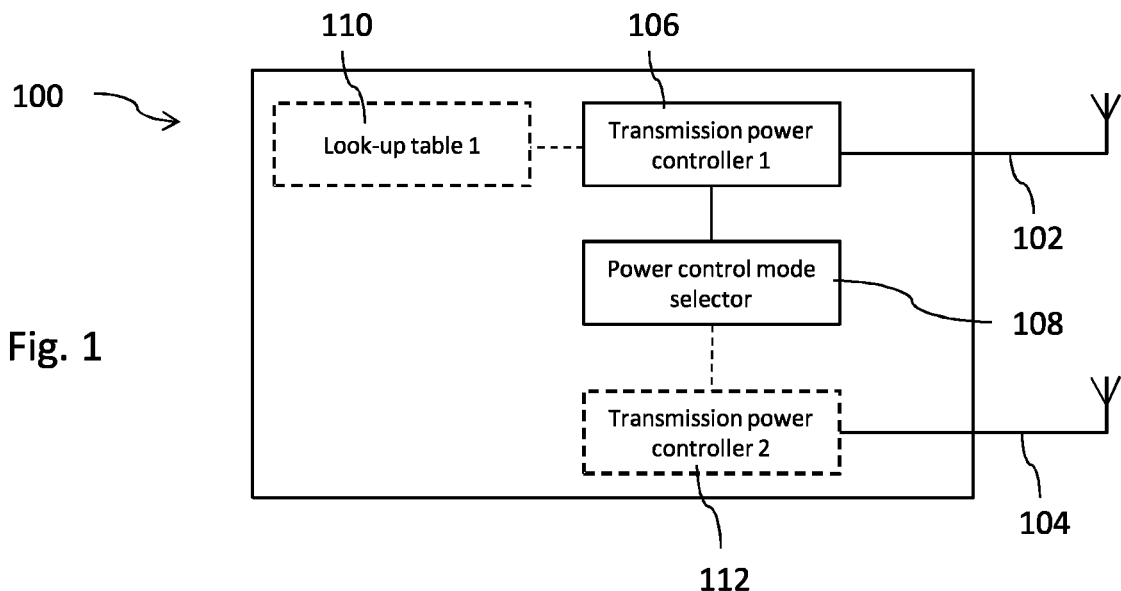
FIG. 1 schematically shows an example of a first data transmission system comprising a power control mode selector.

In the following detailed description, reference is made to the accompanying drawings in which are shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense.

It is to be understood that the features of the various examples described herein may be combined with each other, unless specifically noted otherwise. Further, like reference numerals designate corresponding identical or similar parts.

As employed in this specification, the terms "coupled" and/or "connected" are not meant to mean in general that the elements must be directly coupled or connected together; intervening functional elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

A data transmission system may be comprised in a telecommunication device such as a wireless device or a cable based device and may be configured for transmitting data from the telecommunication device to a second telecommunication device. Examples for wireless devices are base stations and mobile devices like mobile phones or laptops. Wireless devices may employ various Radio Access Technologies (RATs) for wireless communications, for example Bluetooth, Wi-Fi (Wireless Fidelity), 2G (Second Generation), 3G (Third Generation), 4G (Fourth Generation), LTE (Long Term Evolution), etc.

A data transmission system may support simultaneous transmission of more than one data stream (this may also be called multi-transmission herein). Multi-transmission is, for example, employed in telecommunication devices featuring Up-Link Carrier Aggregation (UL-CA), Dual Sim Dual Active (DSDA) or Transmission-Multiple Input Multiple Output (TX-MIMO). UL-CA is a feature of LTE-A (LTE-Advanced, Release 10 and higher versions of LTE). Multi-transmission may increase a data transfer rate of the telecommunication device. For example, in LTE-A two or more component carriers may be aggregated to achieve a transmission bandwidth of 40 MHz, or even 100 MHz. Therefore, the data transmission system may simultaneously transmit in two different frequency bands. Furthermore, it is possible that two different RATs are active at the same time in a multi-transmission capable data transmission system. For example, in DSDA a 2G telephone call associated with a first SIM card and an LTE data transfer associated with a second SIM card may be active simultaneously. In some features, for example in DSDA, it is of course also possible to simultaneously transmit first data and receive second data.

A data transmission system may comprise means for controlling a transmission power of a data transmission. Means for controlling a transmission power may comprise a power control mode selector, a first transmission power controller comprised in a first transmission chain and a second transmission power controller comprised in a second transmission chain. Controlling the transmission power may comprise accurately controlling transmission power step sizes and/or a maximum transmission power. For example, for 3G Frequency-Division Duplexing (FDD) systems the 3GPP TS 25.101 specification defines a maximal tolerated transmission power step size error of ±0.5 dB per 1 dB transmission power change. In Time-Division Duplexing (TDD) systems, such as for example GSM (Global Systems for Mobile Communications) or LTE TDD, data may be transmitted slot-wise. The means for controlling the transmission power may be configured to ramp up the transmission power of a transmission chain to a target transmission power level at the beginning of a data transmission slot and may be configured to ramp down the transmission power to a specific minimum level at the end of the data transmission slot. For example, in LTE TDD the minimum level may be less than about −40 dBm and the target transmission power level may be about 23 dBm.

FIG. 1 shows an exemplary data transmission system 100. The data transmission system 100 may comprise a first transmission chain 102, a second transmission chain 104 and a power control mode selector 108. The first transmission chain 102 may comprise a first transmission power controller 106, wherein the first transmission power controller 106 is coupled to the power control mode selector 108.

The data transmission system 100 may optionally comprise a second transmission power controller 112 comprised in the second transmission chain 104. The second transmission power controller 112 may be coupled to the power control mode selector 108.

The data transmission system 100 may optionally comprise a first look-up table 110. The first look-up table 110 may be coupled to the first transmission power controller 106. The first look-up table 110 may optionally be coupled to the second transmission power controller 112 (not shown in FIG. 1).

The first and the second transmission chains 102, 104 may be configured to be coupled to a first and a second transmission means, respectively. The first and second transmission means may comprise a first and a second antenna (schematically shown in FIG. 1). Instead of antennas, the first and second transmission means may comprise first and second data transmission cables. Alternatively, the first and the second transmission chains 102, 104 may be configured to be coupled to a common transmission means. The common transmission means may comprise a common antenna or a common data transmission cable. A diplexer may, for example, be configured to combine transmission data of the first and second transmission chains 102, 104 in the common transmission means.

Although only first and second transmission chains 102 and 104 are shown, data transmission system 100 may also comprise further data transmission chains. The further transmission chains may comprise corresponding transmission power controllers coupled to the power control mode selector 108. The further transmission power controller(s) may be coupled to the first look-up table 110.

The first transmission power controller 106 may be configured to operate in a first power control mode or a second power control mode in order to control a first transmission power of the first transmission chain 102. The second transmission power controller 112 may be configured to operate in the first power control mode or the second power control mode in order to control a second transmission power of the second transmission chain 104. The power control mode selector 108 may be configured to select the first transmission power controller 106 to operate in the first power control mode or in the second power control mode. The power control mode selector 108 may further be configured to select the second transmission power controller 112 to operate in the first power control mode or in the second power control mode.

The first power control mode may comprise a closed loop power control mode and the second power control mode may comprise an open loop power control mode.

In the closed loop power control mode the power control may use of a feedback mechanism. The transmission power may be measured and compared to a target transmission power level. Measuring the transmission power may, for example, be done using a coupler in the respective transmission chain. The difference between the measured transmission power and the target transmission power may be applied as an input to the respective transmission power controller, thereby adjusting the transmission power until the difference is zero or falls below a certain threshold. Adjusting the transmission power may comprise changing a signal fed by the respective transmission power controller into the respective transmission chain. The signal may, for example, be fed into a power amplifier comprised in the transmission chain. For example, an input power of the input signal of the power amplifier may be changed based on the signal. It is also possible to change the bias of the power amplifier, for example by changing a quiescent current and/or a supply voltage of the power amplifier based on the signal.

In the open loop power control mode the transmission power may be adjusted without measuring the transmission power and without applying a feedback mechanism. Instead, data on the target transmission power levels and the corresponding input values of the respective transmission chain may be stored in a memory and may be read out when required. For example, target transmission power levels and corresponding input values may be stored in the first look-up table 110 as described further below with respect to FIG. 4. The input values may comprise values of an input of a power amplifier comprised in the respective transmission chain as described above.

The data transmission system 100 may be configured to update entries of the first look-up table 110 while the first transmission power controller 106 operates in the closed loop power control mode and the transmission power is measured. This approach of refreshing the first look-up table 110 from time to time by actual data is explained in greater detail further below with respect to FIG. 4.

The power control mode selector 108 may be configured to select the first transmission power controller 106 to operate in the closed loop power control mode if operation conditions in the first transmission chain 102 are such that a reliable measurement of the transmission power is deemed possible. If operation conditions in the first transmission chain 102 are such that a reliable measurement of the transmission power is deemed not possible, the power control mode selector 108 may be configured to select the first transmission power controller 106 to operate in the open loop power control mode. Here "reliable" means that the measured transmission power and the actual transmission power are identical or that the difference between the two is below than a certain threshold.

For example, in some cases a reliable measurement of the transmission power of the first transmission chain 102 may not be possible if the second transmission chain 104 transmits simultaneously. Transmitted power of the second transmission chain 104 may be coupled into the first transmission chain 102 due to a finite isolation between the two respective transmission means and may contribute to the measured transmission power of the first transmission chain. Therefore, the measured transmission power may be higher than the actual transmission power.

This is further illustrated by the following example: the first transmission chain 102 may transmit with a first transmission power of 10 dBm, the second transmission chain 104 may simultaneously transmit with a transmission power of 33 dBm and an isolation between the first transmission means and the second transmission means may be 15 dBm. In this case about 18 dBm of the transmission power of the second transmission chain 104 is, e.g., inductively coupled into the first transmission chain 102. This leakage power may form a reverse wave in the first transmission chain 102 as seen from the perspective of a directional coupler. However, the second transmission chain 104 may transmit at a different radio frequency compared to the first transmission chain 102. Therefore, the reverse wave may be reflected at a duplexer or another component of the first transmission chain 102. The reflected wave may form a forward wave which may add to the first transmission power. Assuming a return loss of 6 dB the power of the reflected wave is about 12 dBm and therefore greater than the first transmission power (which in this example is only 10 dBm). This would result in a highly incorrect measurement of the transmission power of the first transmission chain 102.

Generally speaking, the selection of the power control mode selector 108 to operate the first transmission power controller 106 in the closed loop power control mode or in the open loop power control mode may be based on at least one quantity indicative of interference induced by the second transmission chain 104 in the first transmission power controller 106 when operating the first transmission power controller 106 in the closed loop power control mode. The at least one quantity may be indicative of actual or assumed interference induced. An example of a power control mode selector 108 is described in greater detail further below with respect to FIG. 3.

Power control mode selector 108 may also be configured to select the second transmission power controller 112 or any further transmission power controllers to operate in the closed loop power control mode or the open loop power control mode as described above with respect to the first transmission power controller 106. Reference is made to the above description to avoid reiteration. By way of example, a method of operating such multi-transmission system may comprise transmitting first data with a first transmission chain 102 and transmitting second data with a second transmission chain 104. For at least a first time period, the first transmission chain 102 may be operated in a closed loop power control mode. A potential interference induced by the second transmission chain 104 in the first transmission chain 102 may be identified, e.g., as described above. Then, for at least a second time period and in response to identifying the potential interference, the first transmission chain 102 may be operated in an open loop power control mode.

Figure 2:
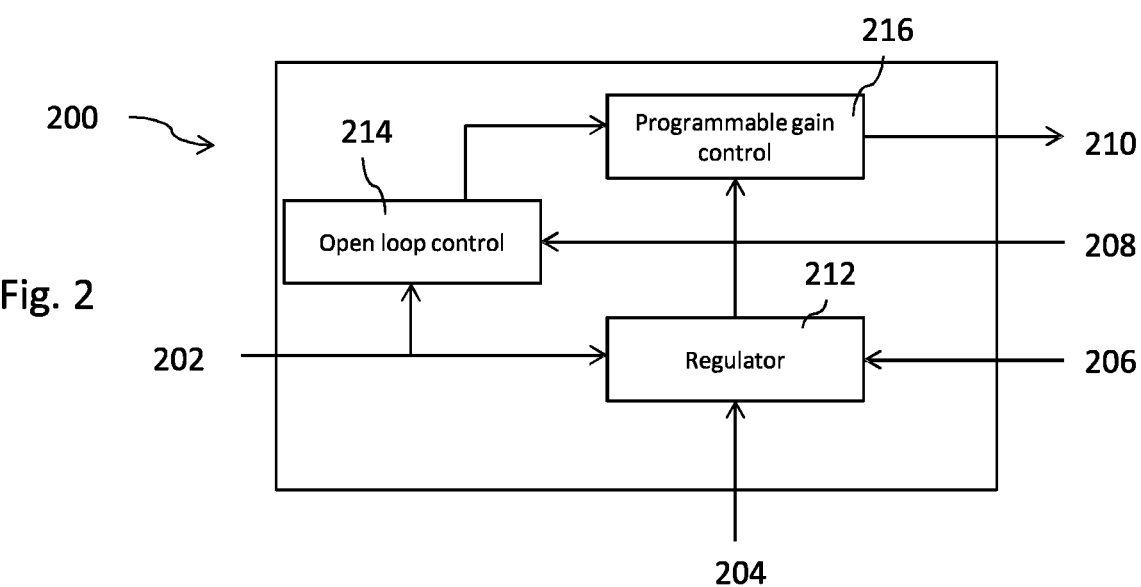
FIG. 2 schematically shows a transmission power controller, wherein the transmission power controller may be employed in a data transmission system as shown in FIG. 1.

FIG. 2 shows an example of a transmission power controller 200, wherein transmission power controller 200 may correspond to the first transmission power controller 106 or the second transmission power controller 112 of FIG. 1. Transmission power controller 200 may comprise a first input 202, a second input 204, a third input 206, a fourth input 208 and an output 210. The transmission power controller 200 may further comprise a regulator 212, wherein the first, second and third inputs 202, 204, 206 may be coupled to the regulator 212. The transmission power controller 200 may further comprise an open loop control 214, wherein the first input 202 and the fourth input 208 may be coupled to the open loop control 214. The transmission power controller 200 may further comprise an programmable gain control 216, wherein an output of the regulator 212 may be coupled to a first input of the programmable gain control 216, an output of the open loop control 214 may be coupled to a second input of the programmable gain control 216 and the output 210 is an output of the programmable gain control 216.

The first input 202 may be configured to be coupled to a baseband integrated circuit (IC), the second input 204 may be configured to be coupled to a power control mode selector, e.g. power control mode selector 108, the third input 206 may be configured to be coupled to a transmission power sensor and the fourth input 208 may be configured to be coupled to a first look-up table, e.g. the first look-up table 110. The output 210 may be configured to be coupled to an input of a power amplifier comprised in a transmission chain.

The regulator 212 may be configured to receive a target transmission power value via the first input 202 and a measured power via the third input 206. The regulator 212 may be configured to receive a signal via the second input 204 setting the regulator 212 to operate in the closed loop power control mode or in the open loop power control mode.

In the closed loop power control mode, the regulator 212 may be configured to compare the target transmission power value received via the first input 202 with the measured power received via the third input 206 and to output a corresponding setting value to the programmable gain control 216 in order to minimize a difference between the target transmission power and the measured power as described above.

In the open loop control mode, the open loop control 214 may be configured to receive a target transmission power value via the first input 202 and may be configured to obtain a corresponding setting value via the fourth input 208. The open loop control 214 may be configured to output the setting value to the programmable gain control 216. In one example of a transmission power controller 200 the open loop control 214 may also be coupled to the second input 204 (not shown in FIG. 2). In this case the open loop control 214 may be configured to receive a signal via the second input 204 activating the open loop control 214 in the open loop power control mode and deactivating the open loop control 214 in the closed loop power control mode. In one example of a transmission power controller 200 the open loop control 214 may, e.g., be comprised in the regulator 212. In this case, the regulator 212 may output a setting value to the programmable gain control 216 which may either be generated by closed loop control operation as described above or by open loop control operation as, e.g., described above in view of the setting value output by the open loop control 214 to the programmable gain control 216.

The programmable gain control 216 may be configured to receive a setting value from the open loop control 214 in the open loop power control mode and a setting value from the regulator 212 in the closed loop power control mode. The programmable gain control 216 may be configured to control an amplification factor of a power amplifier coupled to output 210 based on the setting value. By way of example, the programmable gain control 216 may be configured to control an input power, a quiescent current and/or a supply voltage of the power amplifier.

Transmission power controller 200 may be implemented in software, in hardware, or in a combination of software and hardware.

Figures 3, 4:
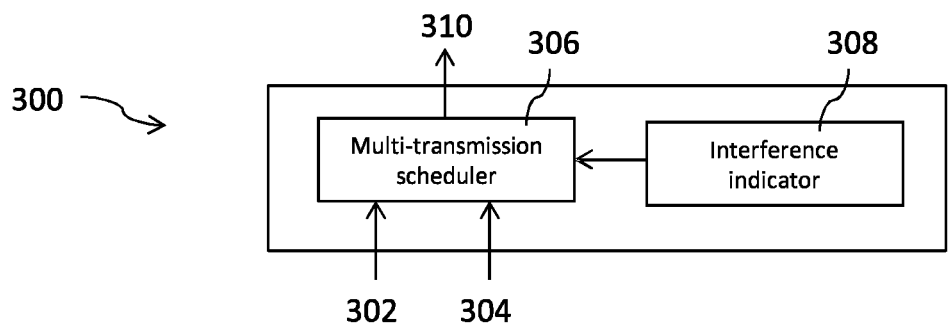
FIG. 3 schematically shows a power control mode selector, wherein the power control mode selector may be employed in a data transmission system as shown in FIG. 1.
FIG. 4 schematically shows a look-up table, wherein the look-up table may be employed in a data transmission system as shown in FIG. 1.

FIG. 3 shows an example of a power control mode selector 300, wherein power control mode selector 300 may correspond to the power control mode selector 108 of FIG. 1. Power control mode selector 300 may comprise a first input 302, a second input 304, a multi-transmission scheduler 306 and a first output 310. The first input 302, the second input 304 and the first output 310 may be coupled to the multi-transmission scheduler 306.

The first input 302 may be configured to be coupled to a first baseband IC. Alternatively, the first input 302 may be configured to be coupled to a first transmission chain. The multi-transmission scheduler 306 may be configured to receive a signal (from the first baseband IC or from the first transmission chain) via the first input 302 indicating that the first transmission chain is active. The second input 304 may be configured to be coupled to a second baseband IC or to the first baseband IC if the first baseband IC is configured to operate the first transmission chain and also a second transmission chain. Alternatively, the second input 304 may be configured to be coupled to the second transmission chain. The multi-transmission scheduler 306 may be configured to receive a signal (from the baseband IC or from the second transmission chain) via the second input 304 indicating that the second transmission chain is active.

The output 310 may be configured to be coupled to a first transmission power controller of the first transmission chain. For example, the output 310 may be configured to be coupled to a regulator comprised in the first transmission chain.

The multi-transmission scheduler 306 may be configured to select the first transmission power controller to operate in the closed loop power control mode or in the open loop power control mode. In an example of a power control mode selector 300 the multi-transmission scheduler 306 may be configured to select the first transmission power controller to operate in the closed loop power control mode if only the first transmission chain is active and in the open loop power control mode if also the second transmission chain is active.

However, simultaneous transmission of the first and second transmission chains may not impair a reliable measurement of transmission power in to the closed loop power control mode in every case. For example, for certain known combinations of a first transmission frequency of the first transmission chain and a second transmission frequency of the second transmission chain an isolation of the first transmission chain may be good enough that transmission power of the second transmission chain coupled into the first transmission chain is zero or below a critical threshold for a reliable measurement of transmission power.

Another quantity that might impair a reliable measurement may be a transmission power pairing of a first transmission power of the first transmission chain and a second transmission power of the second transmission chain. For example, in the case that the second transmission power exceeds a certain threshold relative to the first transmission power, a reliable measurement may not be possible.

Therefore, in a further example the power control mode selector 300 comprises an interference indicator 308 configured to signal the multi-transmission scheduler 306 if an interference situation prevails or not ("interference situation" means that no reliable measurement of transmission power is deemed possible). In the case of an interference situation the multi-transmission scheduler 306 selects the open loop power control mode while in the case of no interference situation the multi-transmission scheduler 306 selects the closed loop power control mode. The interference indicator 308 may, for example, comprise a table containing data on transmission frequency pairings and/or (target) transmission power pairings in which an interference situation prevails. These data may, for example, stem from prior knowledge, i.e. the occurrence or non-occurrence of an interference situation may be evaluated without measurement on the basis of a-priory information. It is also possible that the occurrence or non-occurrence of an interference situation may be evaluated based on combined a-priori and measurement information.

According to an example the power control mode selector 300 may comprise a third input (not shown in FIG. 3). The third input may be an input of the interference indicator 308, and the interference indicator 308 may be configured to receive information indicating an interference situation via the third input. For example, the interference indicator 308 may receive information about channels used in the first and second transmission chains or (measured or target) transmission powers of the first and second transmission chains via the third input. Furthermore, the first (and/or the second) transmission chain may comprise a directional coupler configured to measure a reverse wave in the first (the second) transmission chain. A high power of the reverse wave is an indication that a transmission power measurement may be corrupted. In order to distinguish between power coupled into the transmission chain (e.g. inductively) from a transmission power reflected at the transmission means (e.g. the antenna), the level of the forward wave and the reverse wave may be compared. If the reverse wave has a higher power than the forward wave then power is coupled into the transmission chain and an interference situation may prevail. This information may also be received by the interference indicator 308 via the third input.

According to an example the power control mode selector 300 comprises a second output (a third output, a fourth output, . . . ), wherein the second output (the third output, the fourth output, . . . ) is an output of the multi-transmission scheduler 306 and is configured to be coupled to a transmission power controller of the second (a third, a fourth, . . . ) transmission chain. The control mode selector 300 may be configured to select the second (third, fourth, . . . ) transmission power controller to operate in the closed loop power control mode or in the open loop power control mode as described above with respect to the first transmission power controller.

Power control mode selector 300 may be implemented in software, in hardware, or in a combination of software and hardware.

FIG. 4 shows an example of a first look-up table 400, wherein the first look-up table 400 may correspond to the first look-up table 110 of FIG. 1. The first look-up table 400 may comprise a first column 402 comprising first entries $x_1$, $x_2$, . . . , $x_n$ and a second column 404 comprising second entries $y_1$, $y_2$, . . . , $y_n$, wherein each first entry $x_1$ may have a corresponding second entry $y_1$.

According to an example of a first look-up table 400, the first entries comprise target transmission power levels of a first transmission chain and the second entries comprise corresponding setting values for a first transmission power controller of the first transmission chain. For example, the setting values may be gain values of a power amplifier of the transmission chain or transceiver gain values.

A data transmission system such as data transmission system 100 may comprise a first look-up table 400 for each transmission chain comprised in the data transmission system. According to another example, the first look-up table 400 may comprise a distinct second column 404 for each transmission chain.

The first and second entries may be predetermined values which stem from prior knowledge and may be fixed. The first and second entries may stem from factory calibration. Calibrating the first look-up table 400 during factory calibration may help to compensate for possible part to part variations. However, according to another example of a first look-up table 400, the first and/or second entries may be updated during an operation of the data transmission system. For example, the first look-up table 400 may be configured to be updated while the data transmission system operates in the closed loop power control mode. The transmission power and the corresponding input value of the power amplifier may be determined. The look-up table 400 may be updated by the determined input value. According to an example of a first look-up table 400, updating may comprise averaging the new data with the existing entry in order to avoid corrupting the look-up table 400 by a failed measurement.

The number of rows (that is, the number of first and second entries) of the first look-up table 400 may be fixed and may have a fixed step size of, e.g., 1 dB. However, the number of entries may also be dynamic and may correspond to the number of different transmission power levels occurring during a transmission period of the transmission chain.

In the open loop power control mode a transmission power controller such as, e.g., the first transmission power controller 106 of FIG. 1 may obtain setting values from a first look-up table like the first look-up table 400.

The second entries (setting values) of the first look-up table 400 may be a function of current operating conditions of the data transmission system. Current operating conditions may, for example, comprise a temperature, a supply voltage, an antenna mismatch, a spatial orientation, etc. of the data transmission system. Changes in the operating conditions may be slow compared to an update rate of the first look-up table 400. However, if a transmission power controller is operated in the open loop power control mode for a prolonged time span, then changes in the operating conditions may lead to an increasing mismatch between the transmission power set according to the first look-up table and the target transmission power.

Therefore, a data transmission system such as data transmission system 100 may comprise a second look-up table (not shown) comprising adjustment values for adjusting the first and/or the second entries of the first look-up table 400, wherein the adjustment values are based on the operating conditions. The adjustment values may be determined based on one or more measurements of the operating conditions. Note that a measurement of the operating conditions may be performed independent of a transmission power controller operating in the open loop or closed loop power control mode. According to an example, the second look-up table is used for adjusting the second entries of the first look-up table 400 if one or more of a time span since a last update of the second entries of the first look-up table, a change in the temperature, a change in the supply voltage and a change in the spatial orientation of the data transmission system (e.g. a mobile device such as, e.g., a mobile phone, smartphone, tablet, laptop, etc.) exceeds a respective certain threshold. Adjustment of the second entries of the first look-up table 400 may be performed by any appropriate combining of the second entries with the adjustment values, e.g. by multiplying or adding the corresponding second entry with the corresponding adjustment value. As such, while updating the second entries of the first look-up table during the closed-loop control operation provides for a kind of self-learning control scheme, the (optional) application of the second look-up table may provide for an additional control mechanism for compensating (residual) changes of operating conditions which are not taken into account by the self-learning scheme.

It is to be noted that the self-learning approach as described above (optionally extended by the operation condition adjustment mechanism) may accurately set the output power during open loop control operation without requiring time-consuming factory calibration and/or complex real-time compensation algorithms.

Figure 5:
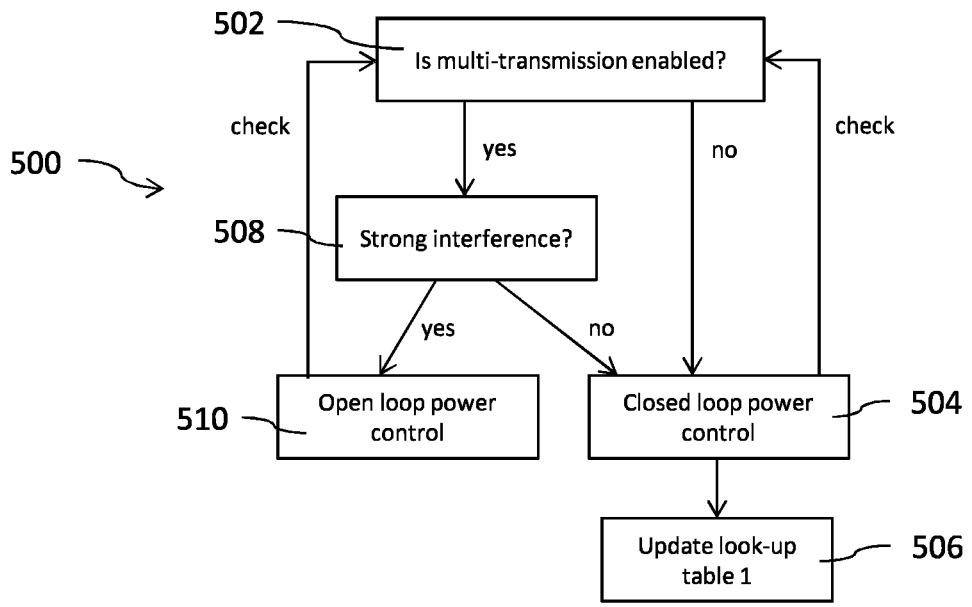
FIG. 5 shows an operation chart depicting a possible mode of operation of a data transmission system.

FIG. 5 shows an operation chart 500 depicting an exemplary operation of a data transmission system such as, e.g., data transmission system 100 of FIG. 1. At 502 it is checked if simultaneous transmission of two or more transmission chains is enabled. If the answer is no, then at 504 a closed loop power control mode is enabled. During the closed loop power control mode at 506, entries of a first look-up table may be updated based on measured transmission power values. If the answer at 502 is yes, then at 508 it may optionally be checked if an interference situation prevails or not. If the answer is no, then the closed loop power control mode is enabled. If the answer at 508 is yes or if the check at 508 is omitted, then an open loop power control mode is enabled. During the closed loop power control mode and/or the open loop power control mode, it may be repeatedly checked if multi-transmission is enabled at 502.

Figure 6:
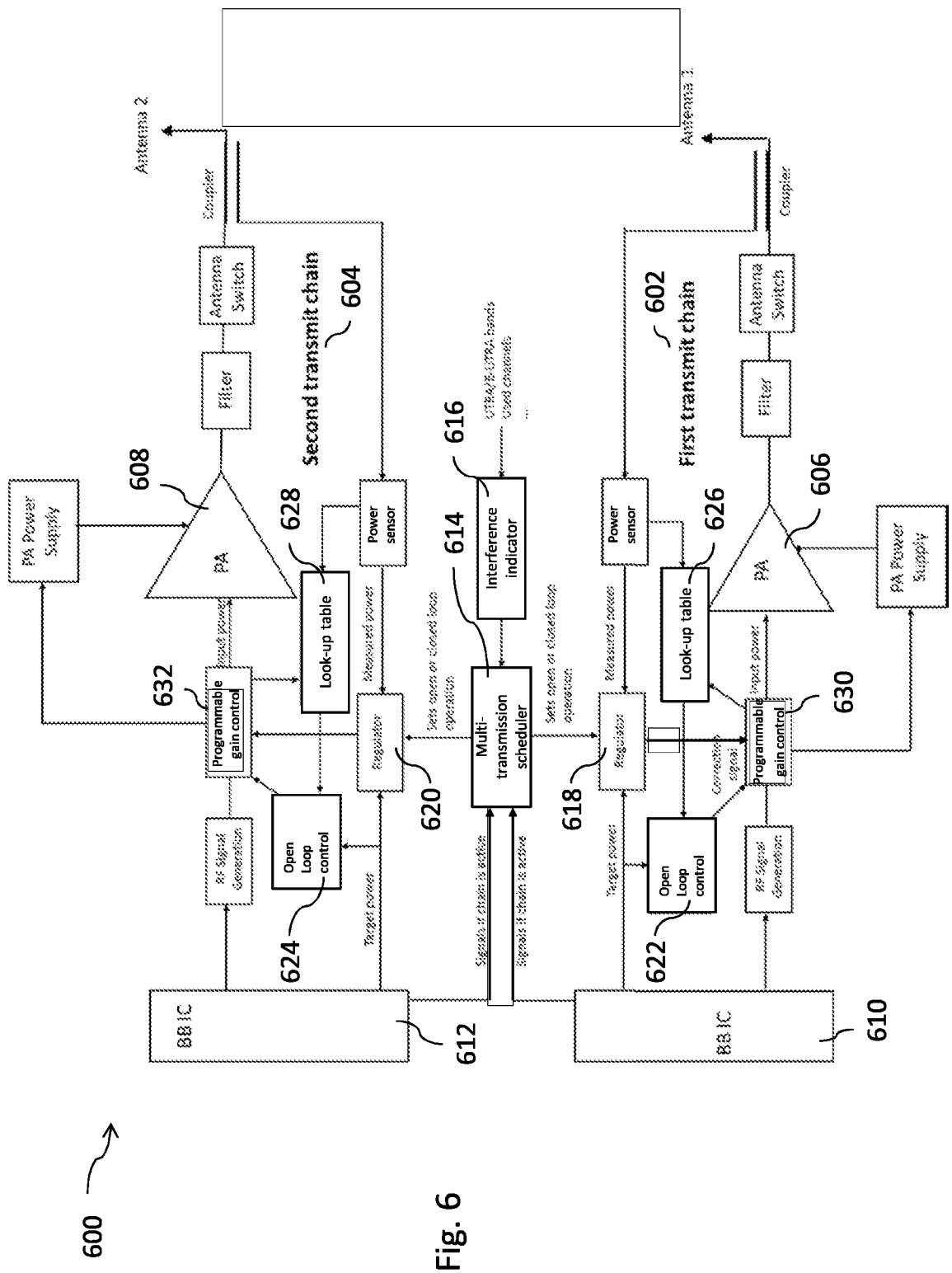
FIG. 6 schematically shows a further example of a data transmission system in greater detail, wherein the data transmission system shown in FIG. 6 may, for example, be implemented in a mobile device.

FIG. 6 shows an example of a data transmission system 600, wherein data transmission system 600 may represent a more detailed example of the data transmission system 100 of FIG. 1. Elements illustrated in FIG. 6 may likewise be implemented in the data transmission system 100 and vice versa. Reference is made to the above description in order to avoid reiteration.

Data transmission system 600 may comprise a first transmission chain 602 configured to be coupled to a first transmission means such as, e.g., a first antenna and to a first baseband IC 610. Data transmission system 600 may comprise a second transmission chain 604 configured to be coupled to a second transmission means such as, e.g., a second antenna and to a second baseband IC 612. Data transmission system 600 may also be configured to be coupled to a common baseband IC and/or to first and second cables or a common cable or a common antenna. The first and second transmission chains 602 and 604 may comprise first and second power amplifiers 606 and 608, respectively. There is a non-infinite isolation between the first and second transmission means.

The data transmission system 600 may further comprise a multi-transmission scheduler 614, an interference indicator 616, regulators 618 and 620, open loop controls 622 and 624, first (and, optionally, second) look-up tables 626 and 628 and programmable gain controls 630 and 632. The open loop controls 622 and 624 may optionally be coupled to the outputs of the multi-transmission scheduler 614 (not shown in FIG. 6). Furthermore, the open loop controls 622 and 624 may be comprised in the regulators 618 and 620, respectively. All these elements may be operable as described above with respect to FIGS. 1 to 4, and reiteration is avoided for the sake of brevity.

Briefly, closed loop power control operation is performed by a feedback loop including, e.g., the coupler, the power sensor, the regulator 618 and 620, respectively, the BB IC 610 and 612, respectively, the programmable gain control 630 and 632, respectively, and the power amplifier 606 and 608, respectively. Optionally, the PA power supply may form part of the feedback loop if the gain of the power amplifier 606 and 608, respectively, is controlled by the amplifier bias.

Open loop power control operation is performed by a forward control including, e.g., the BB IC 610 and 612, respectively, the open loop control 622 and 624, respectively, the programmable gain control 630 and 632, respectively, and the power amplifier 606 and 608, respectively.

Optionally, the PA power supply may form part of the open loop control if the gain of the power amplifier 606 and 608, respectively, is controlled by the amplifier bias. Further, if a self-learning approach as described above is implemented, the open loop power control may, e.g., be supplemented by the coupler, the power sensor and the first (and, optionally, second) look-up table 626 and 628, respectively.

Selection between the open loop power control operation and the closed loop power control operation for one or each of the first and second transmit chains 602, 604 may be performed by, e.g., the interference indicator 616 and the multi-transmission scheduler 614 as described above with respect to FIG. 3.

The symmetric design of the first and second transmit chains 602 and 604 as exemplified in FIG. 6 is a mere option. It is also possible that the first and second transmit chains 602 and 604 are quite different and/or that only one of these transmit chains is implemented with the circuitry disclosed herein.

Further, it is to be noted that the concept of alternatingly operating one or more of the transmit chains 602 and 604 in the open and closed power control mode based on the output of the power control mode selector (e.g. the interference indicator 616 and the multi-transmission scheduler 614) and the concept of applying a self-learning approach for improving the open loop power control are basically independent from each other. As such, they may be combined in various embodiments but may, in other embodiments, also be implemented individually without making use of the other concept.

Figure 7:
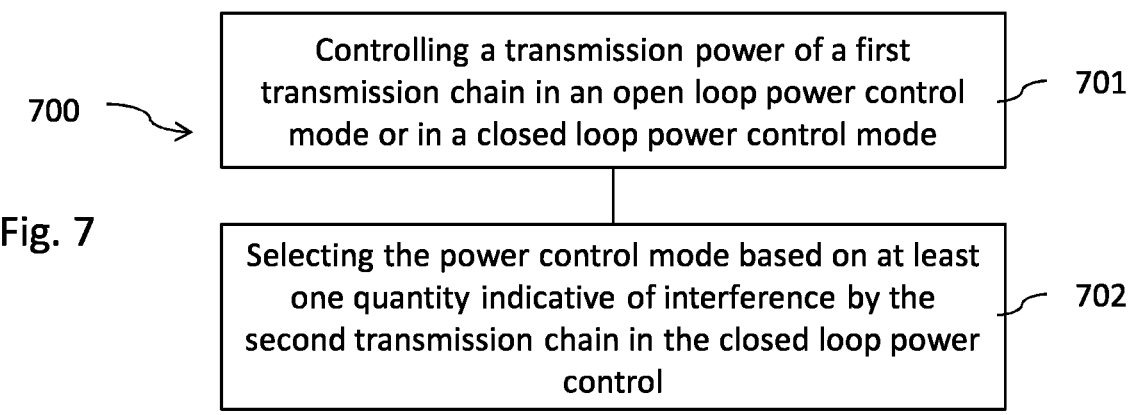
FIG. 7 shows a chart of an example of a method of operating a multi-transmission data transmission system, wherein the method may be used to operate the data transmission systems shown in FIGS. 1 and 6.

FIG. 7 shows an example of a method 700 of operating a multi-transmission system such as, e.g., the data transmission system 100 of FIG. 1, wherein the multi-transmission system is configured to transmit first data using a first transmission chain and second data using a second transmission chain. Method 700 may comprise at 701 controlling a transmission power of the first transmission chain in an open loop power control mode or in a closed loop power control mode. Method 700 may comprise at 702 selecting the power control mode based on at least one quantity indicative of interference induced by the second transmission chain in the closed loop power control. Processes 701 and 702 may be performed consecutively or simultaneously.

EXAMPLES

The following examples pertain to further embodiments. Example 1 is a data transmission system comprising a first transmission chain comprising a first transmission power controller, the first transmission power controller being configured to operate in an open loop power control mode or in a closed loop power control mode; a second transmission chain; and a power control mode selector configured to select the first transmission power controller to operate in the open loop power control mode or in the closed loop power control mode based on at least one quantity indicative of interference induced by the second transmission chain in the first transmission power controller when operating in the closed loop power control mode.

In Example 2 the subject matter of Example 1 may comprise that the power control mode selector is configured to select based on the data transmission system being operated in a multi-transmission mode or a single-transmission mode.

In Example 3 the subject matter of Examples 1 or 2 may comprise that the power control mode selector is configured to select based on a frequency pairing of a first transmission frequency of the first transmission chain and a second transmission frequency of the second transmission chain.

In Example 4 the subject matter of any of the preceding Examples may comprise that the power control mode selector is configured to select based on a transmission power pairing of a first transmission power of the first transmission chain and a second transmission power of the second transmission chain.

In Example 5 the subject matter of any of the preceding Examples may comprise that the power control mode selector is configured to select based on a measurement indicative of a leakage of transmission power of the second transmission chain into the first transmission chain.

In Example 6 the subject matter of any of the preceding Examples may further comprise a first look-up table, wherein the first look-up table is configured to perform an update process of entries of the first look-up table based on transmission power measurement values obtained while the data transmission system is operated in the closed loop power control mode; and wherein, in the open loop power control mode, the first transmission power controller is configured to set the transmission power of the first transmission chain based on the first look-up table.

In Example 7 the subject matter of Example 6 may further comprise an interference indicator configured to enable or disable the update process, wherein the interference indicator is configured to enable the update process if the interference induced by the second transmission chain in the first transmission power controller when operating in the closed loop power control mode is estimated to be small.

In Example 8 the subject matter of Examples 6 or 7 may comprise that the first look-up table comprises first entries and second entries, wherein the first entries are target transmission power levels of the first transmission chain, wherein the second entries are setting values for the first transmission power controller, and wherein each setting value corresponds to a respective target transmission power level.

In Example 9 the subject matter of Example 8 may further comprise a second look-up table, wherein the second look-up table comprises adjustment values for adjusting the second entries of the first look-up table, the adjustment values being based on one or more of a temperature, a supply voltage and a spatial orientation of the data transmission system.

In Example 10 the subject matter of Example 9 may comprise that the second look-up table is configured to adjust the second entries of the first look-up table if one or more of a time span since a last update of the second entries of the first look-up table, a change in the temperature, a change in the supply voltage and a change in the spatial orientation of the data transmission system exceeds a respective certain threshold.

In Example 11 the subject matter of any one of the preceding Examples may comprise that the data transmission system is comprised in a wireless device.

In Example 12 the subject matter of any one of the preceding Examples may comprise that the data transmission system is comprised in a cable-based device.

In Example 13 the subject matter of any one of the preceding Examples may further comprise a second transmission power controller comprised in the second transmission chain, wherein the power control mode selector is configured to select the second transmission power controller to operate in the open loop power control mode or in the closed loop power control mode, wherein the selection is based on at least one quantity indicative of interference induced by the first transmission chain in the second transmission power controller when operated in the closed loop power control mode.

In Example 14 the subject matter of any one of the preceding Examples may comprise that the first transmission chain is configured to transmit first data via a first antenna and the second transmission chain is configured to transmit second data via a second antenna.

In Example 15 the subject matter of any one of the preceding Examples may comprise that the first transmission chain and the second transmission chain are configured to transmit first data and second data via a common antenna.

In Example 16 the subject matter of any one of the preceding Examples may comprise that the power control mode selector is implemented in software.

In Example 17 the subject matter of any one of the preceding Examples may comprise that the first transmission chain comprises a power amplifier, wherein the first transmission power controller is configured to control an input power of the power amplifier.

In Example 18 the subject matter of any one of the preceding Examples may comprise that the first transmission chain comprises a power amplifier, wherein the first transmission power controller is configured to control a power supply of the power amplifier.

Example 19 is a multi-transmission communication system comprising a first transmitter; a first transmission power controller configured to control a transmission power of the first transmitter; a second transmitter; a power control mode selector configured to receive at least one quantity and to set the first transmission power controller in an open loop power control mode or a closed loop power control mode based on the at least one quantity; wherein the at least one quantity is indicative of interference induced by the second transmitter in the first transmission power controller when operating in the closed loop power control mode.

Example 20 is a method of operating a multi-transmission system, wherein the multi-transmission system is configured to transmit first data using a first transmission chain and second data using a second transmission chain, the method comprising controlling a transmission power of the first transmission chain in an open loop power control mode or in a closed loop power control mode; and selecting the power control mode based on at least one quantity indicative of interference induced by the second transmission chain in the closed loop power control.

In Example 21 the subject matter of Example 20 may further comprise controlling the transmission power of the first transmission chain in the open loop power control mode by using a first look-up table; measuring the transmission power of the first transmission chain in the closed loop power control mode; and updating the first look-up table based on measured transmission power values obtained during closed loop power control mode operation.

In Example 22 the subject matter of Example 21 may comprise that updating of the first look-up table is enabled only if an interference indicator indicates that the interference induced by the second transmission chain in the closed loop power control is estimated to be below a given threshold.

In Example 23 the subject matter of Examples 21 or 22 may comprise that first entries of the first look-up table are target transmission power levels of the first transmission chain, wherein second entries of the first look-up table are setting values for controlling the transmission power of the first transmission chain, and the method may further comprise updating the second entries of the first look-up table so as to obtain a closer correspondence between the target transmission power levels and actual transmission power levels.

In Example 24 the subject matter of Example 23 may further comprise adjusting the second entries of the first look-up table on the basis of adjustment values of a second look-up table, wherein the adjustment values are based on one or more of a temperature, a supply voltage and a spatial orientation of the multi-transmission system.

Example 25 is a method of updating a first look-up table configured to adjust the transmission power of a transmission chain in an open loop control mode, the method comprises operating the transmission chain in the open loop control mode based on power control entries in the first look-up table which are setting values for controlling the transmission power; switching to a closed loop control mode for operating the transmission chain; measuring the transmission power of the transmission chain in the closed loop power control mode; updating the power control entries in the first look-up table based on measured transmission power values obtained during closed loop control mode operation; and switching back to the open loop control mode for operating the transmission chain based on the updated power control entries in the first look-up table.

In Example 26 the subject matter of Example 25 may further comprise enabling or disabling the update process using an interference indicator, wherein the interference indicator is configured to enable the update process only if an interference induced into the transmission chain when operating in the closed loop power control mode is estimated to be below a given threshold.

In Example 27 the subject matter of Example 25 may further comprise the power control entries of the first look-up table comprising input values of a power amplifier.

In Example 28 the subject matter of Example 25 may further comprise adjusting the power control entries of the first look-up table using adjustment values in a second look-up table, wherein the adjustment values are based on one or more of a temperature, a supply voltage and a spatial orientation of a data transmission system comprising the transmission chain.

In Example 29 the subject matter of Example 28 may further comprise adjusting the power control entries of the first look-up table if one or more of a time span since a last update of the power control entries of the first look-up table, a change in the temperature, a change in the supply voltage and a change in the spatial orientation of the data transmission system exceeds a respective certain threshold.

Example 30 is a method of operating a multi-transmission system, the method comprising: with a first transmission chain, transmitting first data; with a second transmission chain, transmitting second data; for at least a first time period, operating the first transmission chain in a closed loop power control mode; identifying potential interference induced by the second transmission chain in the first transmission chain; and for at least a second time period and in response to identifying the potential interference, operating the first transmission chain in an open loop power control mode.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A data transmission system comprising:
a first transmission chain comprising a first transmission power controller, the first transmission power controller is configured to operate in an open loop power control mode or in a closed loop power control mode;
a second transmission chain; and
a power control mode selector configures the first transmission power controller to operate in the open loop power control mode or in the closed loop power control mode based on at least one quantity indicative of interference induced by the second transmission chain in the first transmission power controller when operating in the closed loop power control mode and based on an activated multi-transmission mode or an activated single transmission mode of the data transmission system.

2. The data transmission system of claim 1, wherein the power control mode selector configures the first transmission power controller based on a frequency pairing of a first transmission frequency of the first transmission chain and a second transmission frequency of the second transmission chain.

3. The data transmission system of claim 1, wherein the power control mode selector configures the first transmission power controller based on a transmission power pairing of a first transmission power of the first transmission chain and a second transmission power of the second transmission chain.

4. The data transmission system of claim 1, wherein the power control mode selector configures the first transmission power controller based on a measurement indicative of a leakage of transmission power of the second transmission chain into the first transmission chain.

5. The data transmission system of claim 1, further comprising:
a first look-up table;
wherein the first look-up table is configured to perform an update process of entries of the first look-up table based on transmission power measurement values obtained while the data transmission system is operated in the closed loop power control mode; and
wherein the open loop power control mode of the first transmission power controller is further configured to set a transmission power of the first transmission chain based on the first look-up table.

6. The data transmission system of claim 5, further comprising:
an interference indicator configured to enable or disable the update process, wherein the interference indicator is configured to enable the update process if the interference induced by the second transmission chain in the first transmission power controller when operating in the closed loop power control mode is estimated to be small.

7. The data transmission system of claim 5, wherein the first look-up table comprises first entries and second entries,
wherein the first entries are target transmission power levels of the first transmission chain;
wherein the second entries are setting values for the first transmission power controller; and
wherein each setting value corresponds to a respective target transmission power level.

8. The data transmission system of claim 7, further comprising:
a second look-up table;
wherein the second look-up table comprises adjustment values for adjusting the second entries of the first look-up table, the adjustment values are based on one or more of a temperature, a supply voltage and a spatial orientation of the data transmission system.

9. The data transmission system of claim 8, wherein the second look-up table is configured to adjust the second entries of the first look-up table if one or more of a time span since a last update of the second entries of the first look-up table, a change in the temperature, a change in the supply voltage and a change in the spatial orientation of the data transmission system exceeds a respective certain threshold.

10. The data transmission system of claim 1, wherein the data transmission system is comprised in a wireless device.

11. The data transmission system of claim 1, wherein the data transmission system is comprised in a cable-based device.

12. The data transmission system of claim 1, further comprising:
a second transmission power controller comprised in the second transmission chain; wherein the power control mode selector configures the second transmission power controller to operate in the open loop power control mode or in the closed loop power control mode, wherein the configuration of the second transmission power controller is based on at least one quantity indicative of interference induced by the first transmission chain in the second transmission power controller when operated in the closed loop power control mode.

13. The data transmission system of claim 1, wherein the first transmission chain is configured to transmit first data via a first antenna and the second transmission chain is configured to transmit second data via a second antenna.

14. The data transmission system of claim 1, wherein the first transmission chain and the second transmission chain are configured to transmit first data and second data via a common antenna.

15. The data transmission system of claim 1, wherein the power control mode selector is implemented in software.

16. The data transmission system of claim 1, wherein the first transmission chain comprises a power amplifier and wherein the first transmission power controller is configured to control an input power of the power amplifier.

17. The data transmission system of claim 1, wherein the first transmission chain comprises a power amplifier and wherein the first transmission power controller is configured to control a power supply of the power amplifier.

18. A multi-transmission communication system comprising: a first transmitter;
a first transmission power controller configured to control a transmission power of the first transmitter;
a second transmitter;
a second transmission power controller configured to control a transmission power of the second transmitter; and
a power control mode selector configured to receive at least one quantity and to set the first transmission power controller in an open loop power control mode or a closed loop power control mode based on the at least one quantity, and based on an activated multi-transmission mode or an activated single transmission mode of the multi-transmission communication system,
wherein the at least one quantity is indicative of interference induced by the second transmitter in the first transmission power controller when operating in the closed loop power control mode.

19. A method of operating a multi-transmission system, wherein the multi-transmission system is configured to transmit first data using a first transmission chain and second data using a second transmission chain, the method comprising:
- controlling a transmission power of the first transmission chain in an open loop power control mode or in a closed loop power control mode; and
- selecting the open loop power control mode or the closed loop power control mode at least partially based on at least one quantity indicative of interference induced by the second transmission chain in the closed loop power control mode and based on an activated multi-transmission system mode or an activated single transmission mode of the multi-transmission system.

20. The method of claim 19, further comprising:
- controlling the transmission power of the first transmission chain in the open loop power control mode by using a first look-up table;
- measuring the transmission power of the first transmission chain in the closed loop power control mode; and
- updating the first look-up table based on measured transmission power values obtained during closed loop power control mode operation.

21. The method of claim 20, wherein updating of the first look-up table is enabled only if an interference indicator indicates that the interference induced by the second transmission chain in the closed loop power control mode is estimated to be below a given threshold.

22. The method of claim 20, wherein first entries of the first look-up table are target transmission power levels of the first transmission chain and wherein second entries of the first look-up table are setting values for controlling the transmission power of the first transmission chain, the method further comprising:
- updating the second entries of the first look-up table so as to obtain a closer correspondence between the target transmission power levels and actual transmission power levels.

23. The method of claim 22, further comprising:
- adjusting the second entries of the first look-up table on a basis of adjustment values of a second look-up table, wherein the adjustment values of the second look-up table are based on one or more of a temperature, a supply voltage and a spatial orientation of the multi-transmission system.

* * * * *